US008982582B2

(12) United States Patent
Malek et al.

(10) Patent No.: US 8,982,582 B2
(45) Date of Patent: Mar. 17, 2015

(54) ELECTRONIC DEVICE WITH ANTENNA CABLE BRACKET

(71) Applicant: Apple Inc., Cupertino, CA (US)

(72) Inventors: Shayan Malek, San Jose, CA (US); John B. Ardisana, II, San Francisco, CA (US); Michael B. Wittenberg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 13/690,629

(22) Filed: Nov. 30, 2012

(65) Prior Publication Data
US 2014/0153211 A1 Jun. 5, 2014

(51) Int. Cl.
H02G 3/32 (2006.01)
H01Q 1/24 (2006.01)
H01Q 1/38 (2006.01)

(52) U.S. Cl.
CPC .............. H01Q 1/243 (2013.01); H01Q 1/38 (2013.01); H02G 3/32 (2013.01)
USPC ........................................................ 361/826

(58) Field of Classification Search
CPC .................................. H01R 9/05; H02G 3/32
USPC ........................................ 174/75 C, 78, 117 F
See application file for complete search history.

(56) References Cited

U.S. PATENT DOCUMENTS 3,763,445 A * 10/1973 Hannaford et al. ........... 333/160
6,407,709 B1 6/2002 Hanshew
7,142,161 B2 11/2006 Smith et al.
7,242,353 B2 * 7/2007 Hung et al. .................... 343/702
7,438,265 B2 * 10/2008 Urzua .......................... 248/74.2
7,724,204 B2 5/2010 Annamaa et al.
8,059,040 B2 * 11/2011 Ayala Vazquez et al. ..... 343/702
2007/0202743 A1 * 8/2007 Mikami ........................ 439/587
2009/0247237 A1 * 10/2009 Mittleman et al. ............ 455/567
2009/0257207 A1 * 10/2009 Wang et al. ................... 361/752
2011/0057858 A1 * 3/2011 Yan et al. ...................... 343/878
2011/0095964 A1 4/2011 Pathak et al.

OTHER PUBLICATIONS

LPKF, "3-Dimensional Circuitry, Laser Direct Structuring Technology (LPKF-LDS) for Moulded Interconnect Devices". [Retrieved on Feb. 28, 2013]. Retrieved from the Internet<URL: http://www.lpkt.com/_mediafiles/1797-lpkf-lds-process.pdf>.

* cited by examiner

Primary Examiner — William H Mayo, III
Assistant Examiner — Krystal Robinson
(74) Attorney, Agent, or Firm — Treyz Law Group; G. Victor Treyz; Kendall P. Woodruff

(57) ABSTRACT

An electronic device contains circuitry such as radio-frequency transceiver circuitry and antenna structures that are coupled using transmission line paths such as coaxial cable paths. A coaxial cable is mounted within an electronic device housing cable mounting structures. The coaxial cable has a meandering portion that forms a service loop. The cable mounting structures includes grooves that receive the meandering portion of the cable. The grooves may be formed within a molded plastic body. Patterned metal may be formed on the surface of the molded plastic body using laser-based processing techniques. The cable in the meandering portion may have a segment in which an outer cable conductor is exposed. The patterned metal on the molded plastic body may short the exposed outer conductor to the electronic device housing or other ground structure.

20 Claims, 13 Drawing Sheets

ELECTRONIC DEVICE WITH ANTENNA CABLE BRACKET

BACKGROUND

This relates generally to electronic devices and, more particularly, to electronic devices with structures for mounting cables within a device housing.

Electronic devices such as cellular telephones and portable computers often contain wireless circuitry. For example, an electronic device may include cellular telephone circuitry for handling long-range wireless communications in cellular telephone bands and may include wireless local area network circuitry for handling shorter-range wireless communications.

Signals are conveyed in electronic devices using traces on printed circuits, wires, cables, and other conductive structures. For example, radio-frequency signals associated with wireless circuitry can be carried on transmission line structures. A transmission line may be formed from traces on a printed circuit. Transmission lines may also be implemented using cables such as coaxial cables.

Challenges arise when mounting signal path components in an electronic device. If care is not taken, cables can be improperly secured within a device, which can make the device prone to mechanical failure or can lead to inadequate signal line grounding.

It would therefore be desirable to be able to provide electronic devices with improved arrangements for securing signal path structures such as coaxial cables.

SUMMARY

An electronic device may contain circuitry such as radio-frequency transceiver circuitry and may contain antenna structures. A transmission line path such as a coaxial cable may be used to couple the radio-frequency transceiver circuitry to the antenna structures.

The coaxial cable may have a first end that is coupled to a printed circuit on which the radio-frequency transceiver circuitry is mounted using a printed circuit coaxial cable connector. The coaxial cable may have an opposing second end that is coupled to metal traces forming an antenna resonating element. The coaxial cable may have a center conductor at the second end that is soldered to the metal traces. The coaxial cable may also have an outer conductor that is shorted to ground.

The coaxial cable may be mounted within an electronic device housing for the electronic device using cable mounting structures. The coaxial cable may have a meandering portion that forms a service loop. The cable mounting structures may include grooves or other cable retention structures that receive and engage the meandering portion of the cable.

The cable retention grooves may be formed within a molded plastic body or other support structure. Patterned metal may be formed on the surface of the molded plastic body using laser-based processing techniques or other processing techniques. The cable in the meandering portion may have a segment in which the outer conductor is exposed and shorted to the patterned metal on the surface of the molded plastic body. The patterned metal may be coupled to ground.

Further features, their nature and various advantages will be more apparent from the accompanying drawings and the following detailed description of the preferred embodiments.

DETAILED DESCRIPTION

Figure 1:
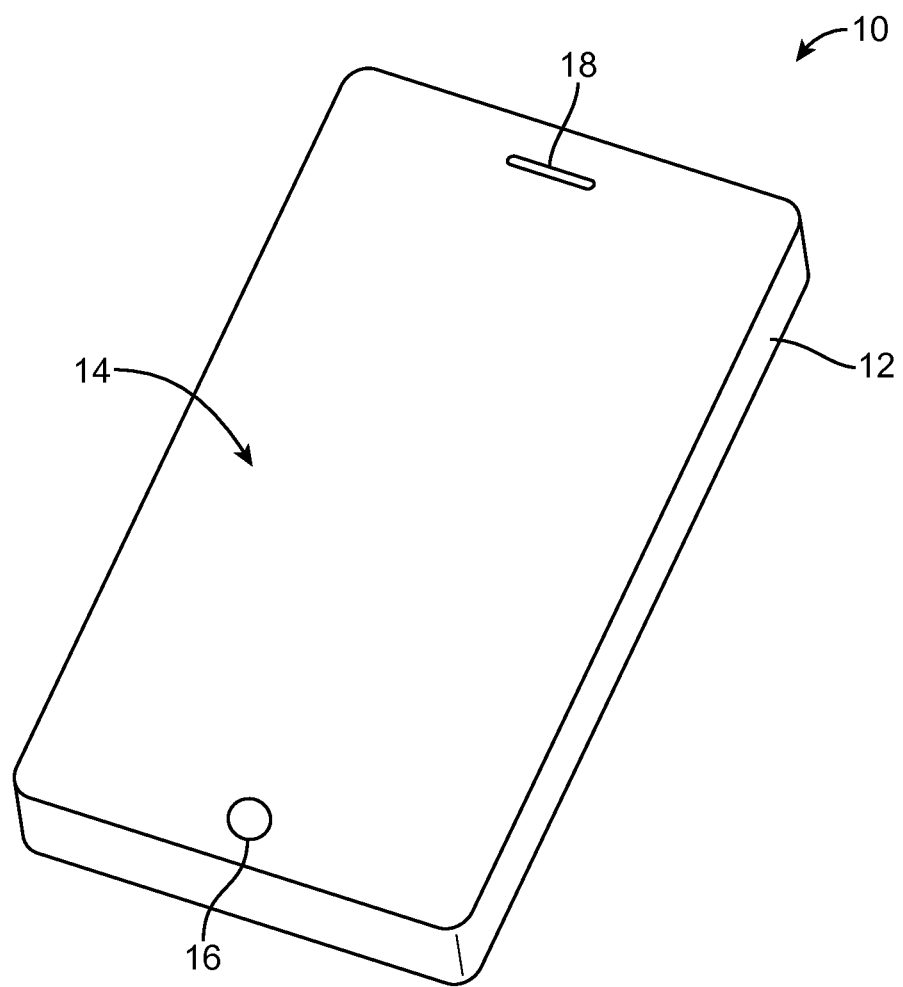
FIG. 1 is a perspective view of an illustrative electronic device of the type that may be provided with cable mounting structures in accordance with an embodiment.

An illustrative electronic device that may be provided with mounting structures for cables is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. This region is sometimes referred to as the active area of the display. A rectangular ring-shaped region surrounding the periphery of the active display region may not contain any active display pixels and may therefore sometimes be referred to as the inactive area of the display. The display cover layer or other display layers in display 14 may be provided with an opaque masking layer in the inactive region to hide internal components from view by a user.

Figure 2:
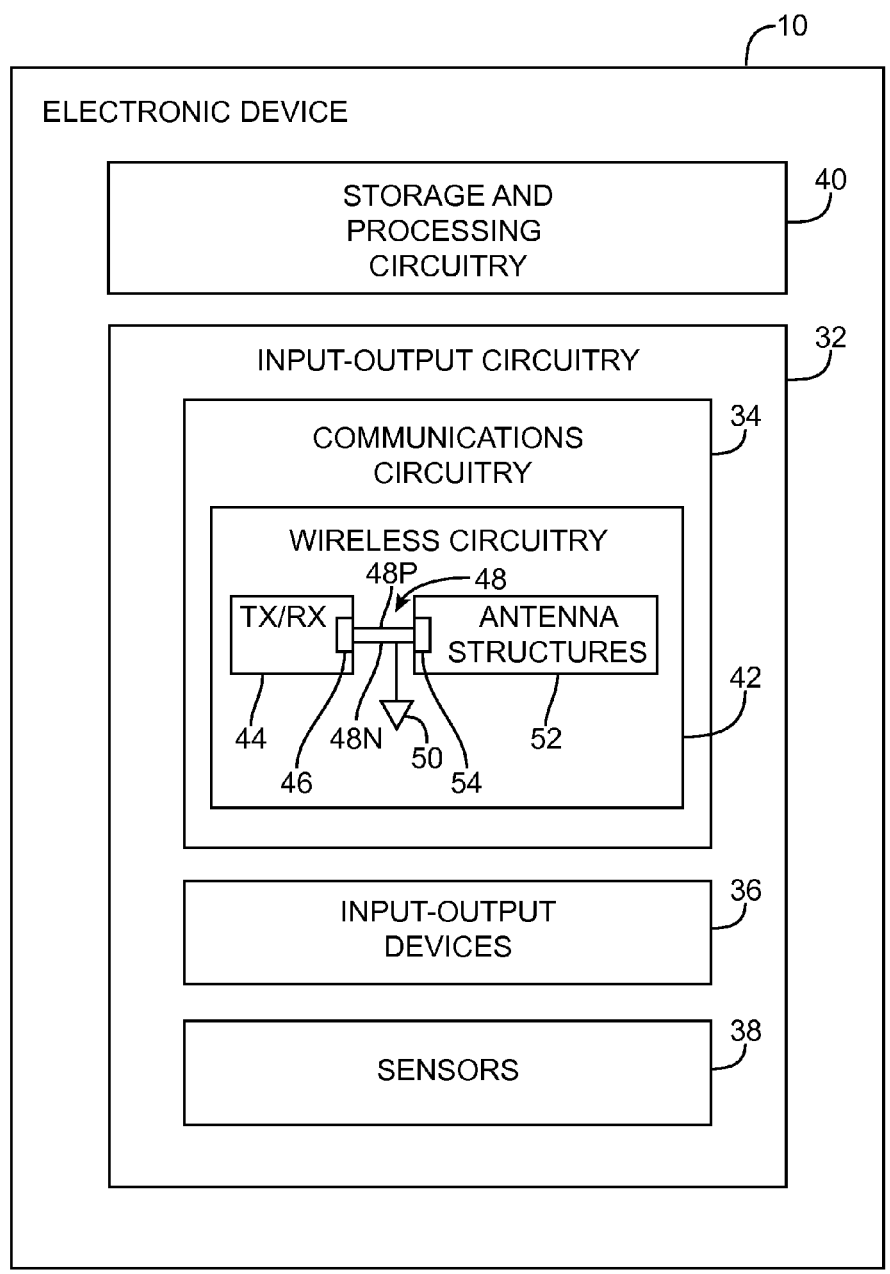
FIG. 2 is a schematic view of an illustrative electronic device of the type that may be provided with cable mounting structures in accordance with an embodiment.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10 such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow input to be supplied to device 10 from a user or external devices and to allow output to be provided from device 10 to the user or external devices.

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures.

Input-output circuitry 32 may include communications circuitry 34. Communications circuitry 34 may include wired communications circuitry such as Universal Serial Bus circuitry and circuitry for handling other types of communications using wired paths. Communications circuitry 34 may also include wireless communications circuitry 42.

Wireless communications circuitry 42 may include radio-frequency (RF) transceiver circuitry formed from one or more integrated circuits (e.g., wireless radio-frequency transceiver 44), power amplifier circuitry, low-noise input amplifiers, passive RF components, one or more antennas such as antenna structures 52, and other circuitry for handling RF wireless signals. Wireless signals can also be sent using light (e.g., using infrared communications).

Radio-frequency transceiver circuitry 44 may be coupled to antenna structures 52 using signal paths such as transmission line 48. Transmission line 48 may include one or more transmission line structures such as printed circuit transmission lines (e.g., microstrip transmission lines, stripline transmission lines, etc.) and coaxial cable transmission lines (as examples). If desired, impedance mating circuitry, switching circuitry, filters, and other circuits may be interposed within transmission line 48.

Transmission line 48 may include positive transmission line signal conductor 48P and ground transmission line signal conductor 48N. Transmission line ground path 48N may, if desired, be shorted to ground 50. For example, a coaxial cable may have a segment in which an outer insulating layer has been removed to expose ground conductor 48N. The portion of the coaxial cable may be grounded to a metal structure in device 10 such as housing 12 or other source of ground (e.g., antenna ground).

Antenna structures 52 may include patterned metal traces on a printed circuit. The printed circuit may have a rigid printed circuit substrate formed from a stiff material such as fiberglass-filled epoxy or a flexible printed circuit substrate formed from a layer of polyimide or a sheet of other flexible polymer. Antenna structures 52 may also be formed using substrates formed of other dielectric materials (e.g., ceramic, glass, injection molded plastic or machined plastic, etc.). Antenna structures 52 may include one or more antenna resonating elements formed from patterned metal traces and/or ground structures formed from patterned metal traces. Antenna resonating element structures and structures for implementing an antenna ground for antenna structures 52 may also be formed from conductive structures such as portions of housing 12 or other conductive structures in device 10.

Antenna structures 52 may include one or more antennas such as inverted-F antennas, planar inverted-F antennas, closed and open slot antennas, loop antennas, monopole antennas, dipole antennas, antennas of other types, and hybrid antennas having a design based on two or more of these antenna types.

During operation of device 10, antenna structures 52 may be used in receiving wireless signals. The wireless signals that are received using antenna structures 52 are conveyed to radio-frequency transceiver circuitry 44 over transmission line path 48. Radio-frequency transceiver circuitry 44 processes the received radio-frequency signals and provides corresponding data to control circuitry 40. When it is desired to transmit data, control circuitry 40 may provide outgoing data to transceiver circuitry 44, which converts the outgoing data into radio-frequency signals. These radio-frequency signals are conveyed to antenna structures 52 over path 48. Antenna structures 52 transmit the signals wirelessly to external equipment.

Transmission line 48 may be coupled to transceiver 44 using connection 46 and may be coupled to antenna structures 52 using connection 54. Connections 46 and 54 may be based on cable connectors (e.g., radio-frequency printed circuit board cable connectors), weld-based connections, solder connections formed by soldering transmission line conductor 48P and/or 48N to contact pads on a printed circuit or other substrate associated with transceiver 44 and/or antenna structures 52, or other connection structures.

With one illustrative configuration, which is sometimes described herein as an example, transmission line 48 may include a coaxial cable. Transceiver circuitry 44 may include integrated circuits and other circuitry that is mounted to a printed circuit board such as a rigid printed circuit board. With this configuration, a printed circuit board coaxial cable connector couples a first end of coaxial cable 48 to transceiver circuitry 44. Antenna structures 52 include patterned metal traces for forming an antenna resonating element on a printed circuit substrate (e.g., a flexible printed circuit substrate). Coaxial cable 48 includes a positive center conductor that forms path 48P and an outer conductor (e.g., braided wire or metal foil) that forms ground path 48N. At a second end of coaxial cable 48, positive center conductor 48P is attached to the antenna resonating element using solder. Ground path 48N is grounded to housing 12 at a location along path 48 between connections 46 and 54 such as a location adjacent to the second end of cable 48 near the structures that form connection 54. The portion of housing 12 to which ground path 48N is grounded may serve as antenna ground 50.

Figure 3:
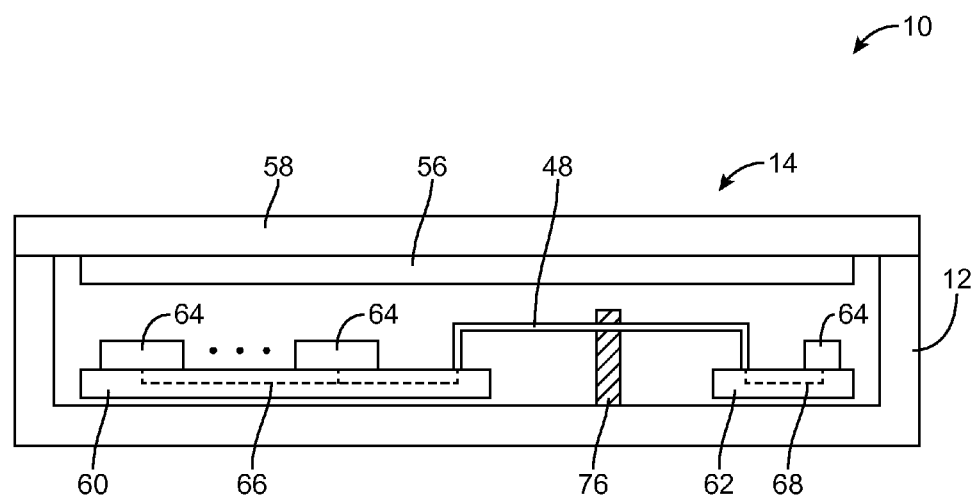
FIG. 3 is a cross-sectional side view of a portion of an electronic device having cable mounting structures in accordance with an embodiment.

A cross-sectional side view of electronic device 10 is shown in FIG. 3. As shown in FIG. 3, display 14 may be mounted in housing 12. Display structures 56 such as a liquid crystal display module, an organic light-emitting diode display layer, or other display structures that include an array of active display pixels may be formed under display cover layer 58 (as an example). Display cover layer 58 may be formed from a clear glass layer, a layer of transparent plastic, or other cover layer material. Display cover layer 58 may be attached to housing 12 using adhesive, fasteners, gaskets, or other mounting structures.

Device 10 may contain one or more substrates such as substrate 60 and substrate 62. Substrates such as substrates 60 and 62 may be mounted within housing 12 using adhesive, fasteners such as screws, mounting brackets, or other mounting structures. Substrates such as substrates 60 and 62 may be coupled to each other using communications paths such as coaxial cable 48. Components 64 may be mounted to substrates 60 and/or 62. Components 64 can include circuitry 40, input-output circuitry 32, integrated circuits, discrete components such as capacitors, resistors, and inductors, radio-frequency shielding cans, sensors, connectors, and other electrical components. With one illustrative example, components 64 on substrate 60 may include transceiver circuitry 44 and components 64 on substrate 62 may include patterned metal antenna traces. Components such as switches, impedance matching components, and filters may also be mounted on substrates 60 and 62, if desired.

In general, there may be any suitable number of substrates within device 10 (e.g., one or more substrates, two or more substrates, three or more substrates, ten or more substrates, etc.). Connections between substrates may be formed from welds, solder balls, conductive adhesive connections such as connections formed form anisotropic conductive film, fasteners, zero-insertion-force connectors, or other electrical coupling structures. As an example, printed circuits in device 10 such as printed circuits 60 and 62 may be connected together using coaxial cable connections using one or more lengths of coaxial cable 48.

Substrates 60 and 62 may be dielectric carriers such as molded plastic carriers or a pieces of glass or ceramic. With one suitable arrangement, which is sometimes described herein as an example, substrates such as substrates 60 and 62 are printed circuits. For example, substrates 60 and 62 may each be a printed circuit such as a rigid printed circuit board formed from a dielectric material such as fiberglass-filled epoxy or a flexible printed circuit formed from a dielectric layer such as a sheet of polyimide or other flexible polymer layer. Metal interconnect paths may be provided on substrates 60 and 62 to allow substrates such as substrates 60 and 62 to covey signals between components. In the example of FIG. 3, substrate 60 includes metal traces 66 and substrate 62 includes metal traces 68.

For satisfactory operation of the circuitry within device 10 such as satisfactory antenna operation, it may be desirable to ground signal paths within device 10. As an example, housing 12 may be formed from a conductive material such as metal that serves as antenna ground 50 of FIG. 2. Structures such as coaxial cable mounting structures 76 may be used in mounting cable 48 within device 10. Cable mounting structures 76 may also be used in forming a conductive path between coaxial cable and housing 12 (ground 50). In particular, structures 76 may include conductive paths such as paths formed from metal traces that electrically connect path 48N within coaxial cable 48 to housing 12. Metal brackets, metal plates, frame structures, wires, springs, and other conductive structures within device 10 may also form part of the ground path between coaxial cable 48 and ground 50.

Figure 4:
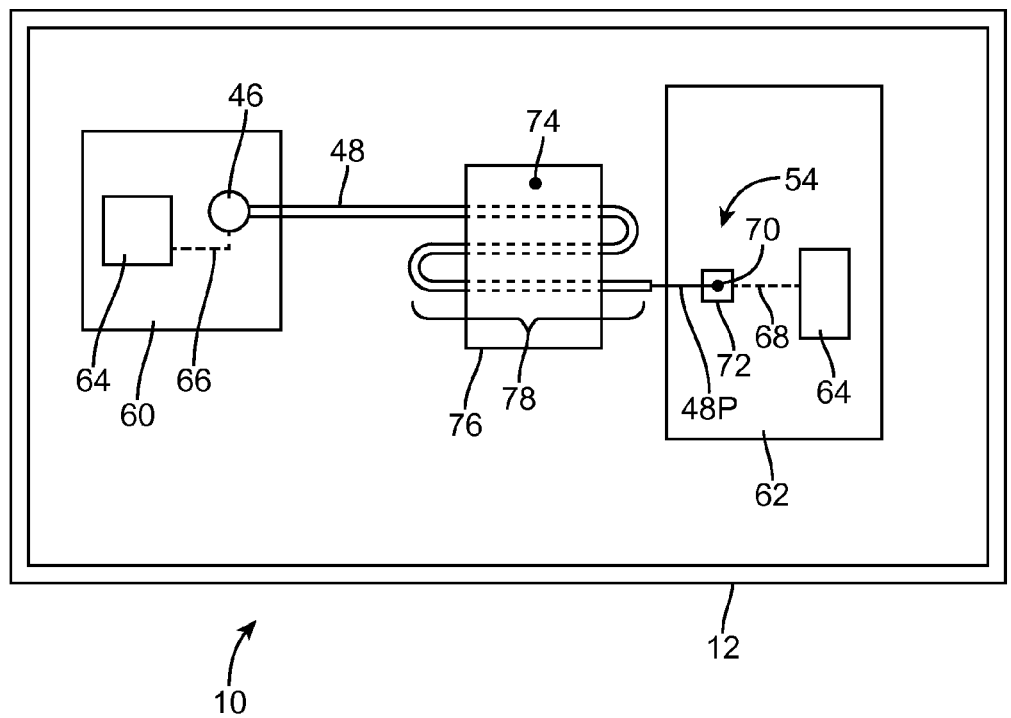
FIG. 4 is a top view of an electronic device having a cable and cable mounting structures for securing a meandering path portion of the cable within the electronic device in accordance with an embodiment.

A top view of device 10 is shown in FIG. 4. As shown in FIG. 4, substrates 64 and 62 are mounted in housing 12. Housing 12 may be fully or partly formed form a conductive material such as metal and may serve as antenna ground 50. Printed circuit 60 includes conductive traces 66 that couple components such as component 64 on printed circuit 60 to connector 46. In the example of FIG. 4, components such as component 64 on printed circuit 60 form radio-frequency transceiver circuitry 44 of FIG. 2. Traces 66 include traces that form transmission line structures. Connector 46 is a coaxial cable printed circuit board connector that couples a first end of coaxial cable 48 to traces 66 on board 60.

Printed circuit board 62 in the example of FIG. 4 includes conductive traces 68. Conductive traces 68 include portions forming antenna resonating element structures 64 for one or more antennas. Conductive traces 68 also include portions forming contacts such as solder pad 72 (e.g., a trace that forms part of an antenna resonating element pattern). Central conductor 48P of cable 48 is soldered to pad 72 using solder 70, thereby forming connection 54 at a second end of coaxial cable 48.

Intermediate portions of cable 48 such as meandering cable portions 78 may be configured to follow a meandering path. The meandering path provides cable 48 with slack (sometimes referred to as a service loop) that can be used to allow substrates 60 and/or 62 to be moved relative to each other during rework or repair operations. Without a service loop, connections 46 and 54 could become damaged during movement of substrates 60 and/or 62. The illustrative service loop of FIG. 4 that is formed by portion 78 of coaxial cable 48 has three parallel segments of coaxial cable 48. If desired, a service loop may have more parallel segments or other suitable service loop shapes (e.g., L-shaped, S-shaped, or U-shaped bends). The configuration of FIG. 4 is merely an example.

Coaxial cable mounting structures 76 may be formed from metal, plastic, ceramic, glass, other materials, or combinations of these materials. As an example, coaxial cable mounting structures 76 may be formed from a dielectric such as plastic onto which patterned metal traces are formed for grounding conductor 48N of coaxial cable to antenna ground 50. Coaxial cable mounting structures 76 may be attached to housing 12 using one or more fasteners such as fastener 74, using adhesive, using mounting brackets, using snaps or other engagement features, or using other suitable attachment mechanisms. Fastener 74 may be a screw that has a threaded shaft that is received in a standoff, a threaded boss, a metal bracket, a threaded opening in housing 12, or other structures in device 10. Screw 74 may, if desired, form part of a conductive path that shorts conductive line 48N in coaxial cable 48 to housing 12 (i.e., ground 50).

Figure 5:
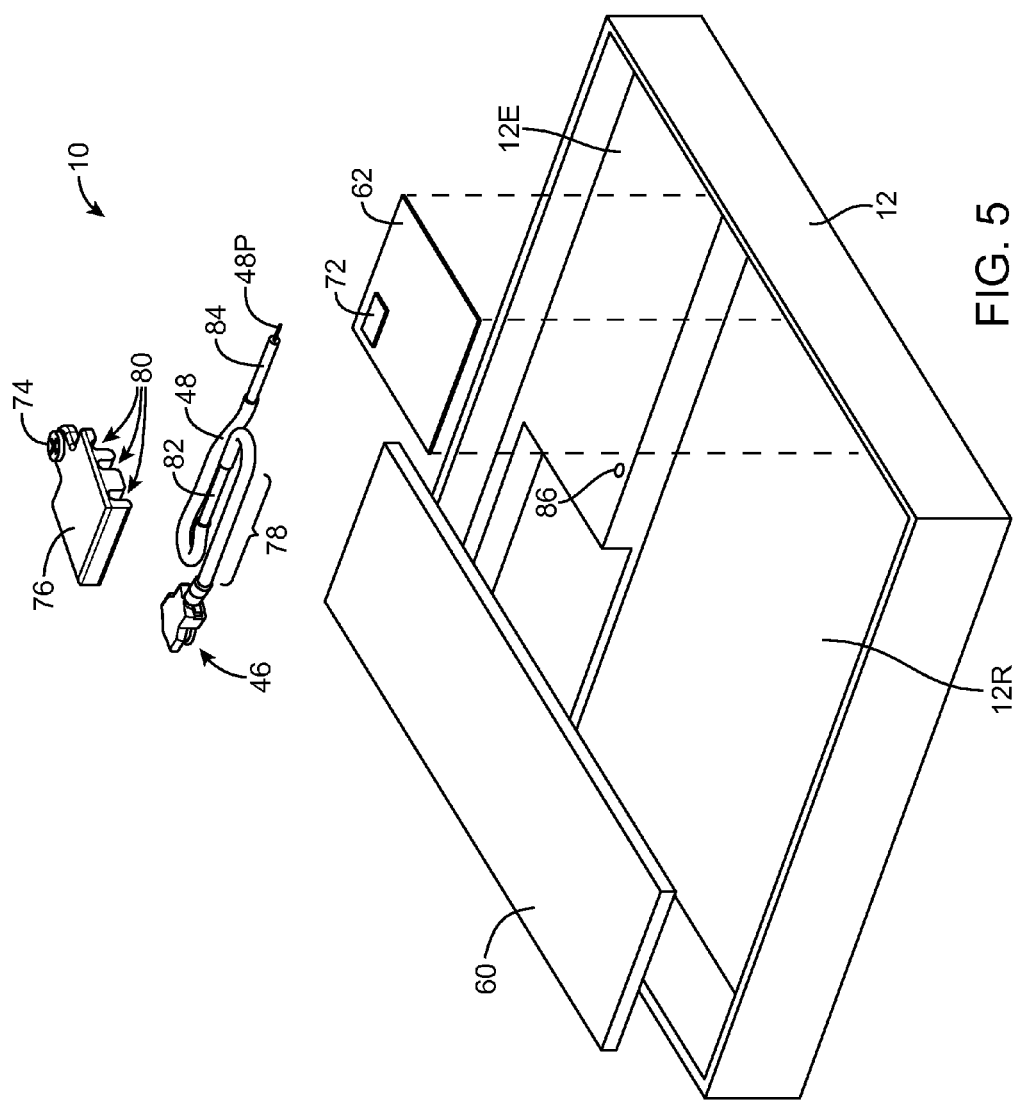
FIG. 5 is an exploded perspective view of an electronic device having a cable mounting structure of the type that may be used to secure a cable to a housing structure in accordance with an embodiment.

FIG. 5 is an exploded perspective view of device 10 in a configuration in which housing 12 has portions such as rear wall portion 12R and elevated portion 12E. Portions 12R and 12E may be part of a common metal structure (e.g., a machined piece of aluminum or other metal), may be conductive structures associated with internal device components such as printed circuits, may be housing frame structures, springs, rails, brackets, or other internal device structures, or may be other portions of device 10. As shown in FIG. 5, housing 12 may be configured to form a recess that receives printed circuit substrate 60. Cable mounting structures 76 may be provided with cable engagement features such as grooves 80. There may be, for example, three groves 80 that are configured to respectively receive three corresponding parallel segments of coaxial cable 48 in service loop portion 78 of cable 48.

Cable 48 has opposing first and second ends. Printed circuit coaxial cable connector 46 is attached to cable 48 at the first end of cable 48. At the second end of cable 48, center conductor 48P is exposed to allow soldering of conductor 48P to antenna resonating element solder pad 72 on printed circuit 62. An inner layer of insulator such as insulator 84 surrounds center conductor 48P within cable 48. A conductive braid or other outer conductor structure for forming conductor 48N surrounds insulator 84. An outer layer of insulator covers conductor 48N and forms an insulating surface for cable 48. In segment 82 of cable 48, the outer layer of insulator is removed from cable 48 to expose conductor 48N.

Cable mounting structures 76 are attached to housing 12 using screw 74. Screw 74 passes through an opening in cable mounting structures 76. A threaded shaft on screw 74 is received in threaded opening 86 in housing 12 (or in structures attached to housing 12).

Cable mounting structures 76 may have patterned metal traces that form a conductive path between the exposed outer conductor layer (e.g., line 48N) in segment 82 of coaxial cable 48 and screw 74 and/or housing 12. Screw 74 may be formed from metal and may help short segment 82 to housing 12. In configurations in which conductor 48N in coaxial cable 48 is shorted to housing 12, housing 12 may serve as antenna ground 50 (FIG. 2).

Figure 6:
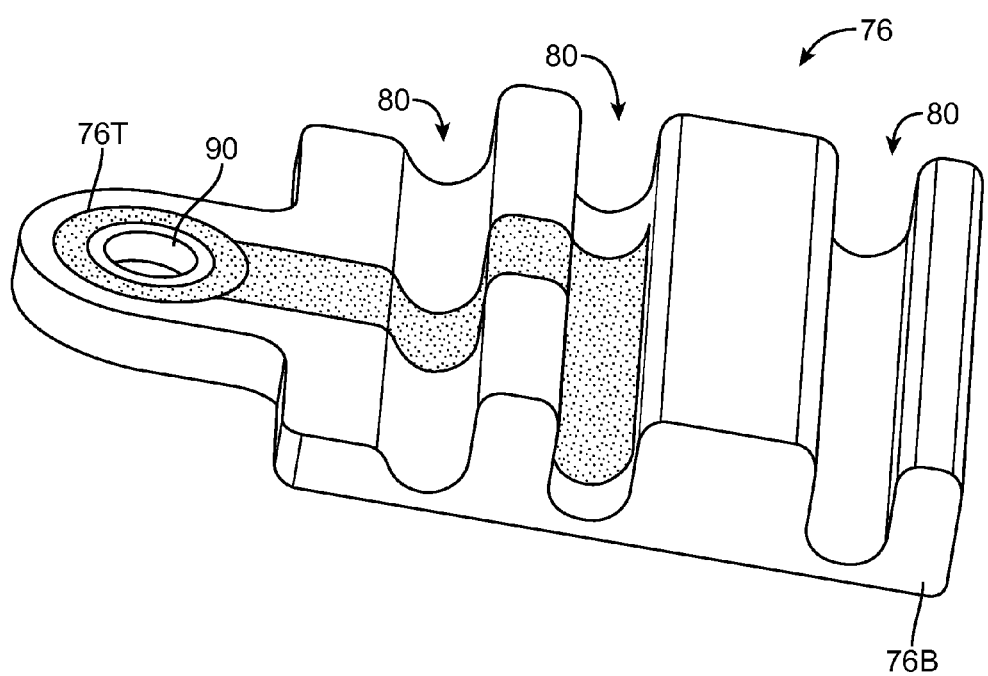
FIG. 6 is a perspective view of the underside of illustrative cable mounting structures showing how the mounting structures may be provided with a conductive trace for grounding a cable to a ground structure such as a metal housing in an electronic device in accordance with an embodiment.

FIG. 6 is a perspective view of the underside (i.e., the grooved side) of cable mounting structures 76 of FIG. 5. As shown in FIG. 6, cable mounting structures may have a body portion such as body 76B and metal traces such as traces 76T. Grooves 80 include a middle groove 80 that receives bare segment 82 of cable 48 (FIG. 5) and two adjacent outer grooves 80 each of which receives a respective insulated portion of cable 48. In the illustrative configuration of FIG. 6, traces 76T surround screw hole 90 and extend across the surface of body 76B so that traces 76T overlap middle groove 80 where traces 76T are shorted to outer conductor 48N of cable 48 in segment 82. Traces 76T may be formed from one or more metals such as copper, aluminum, or gold (as examples).

Figure 7:
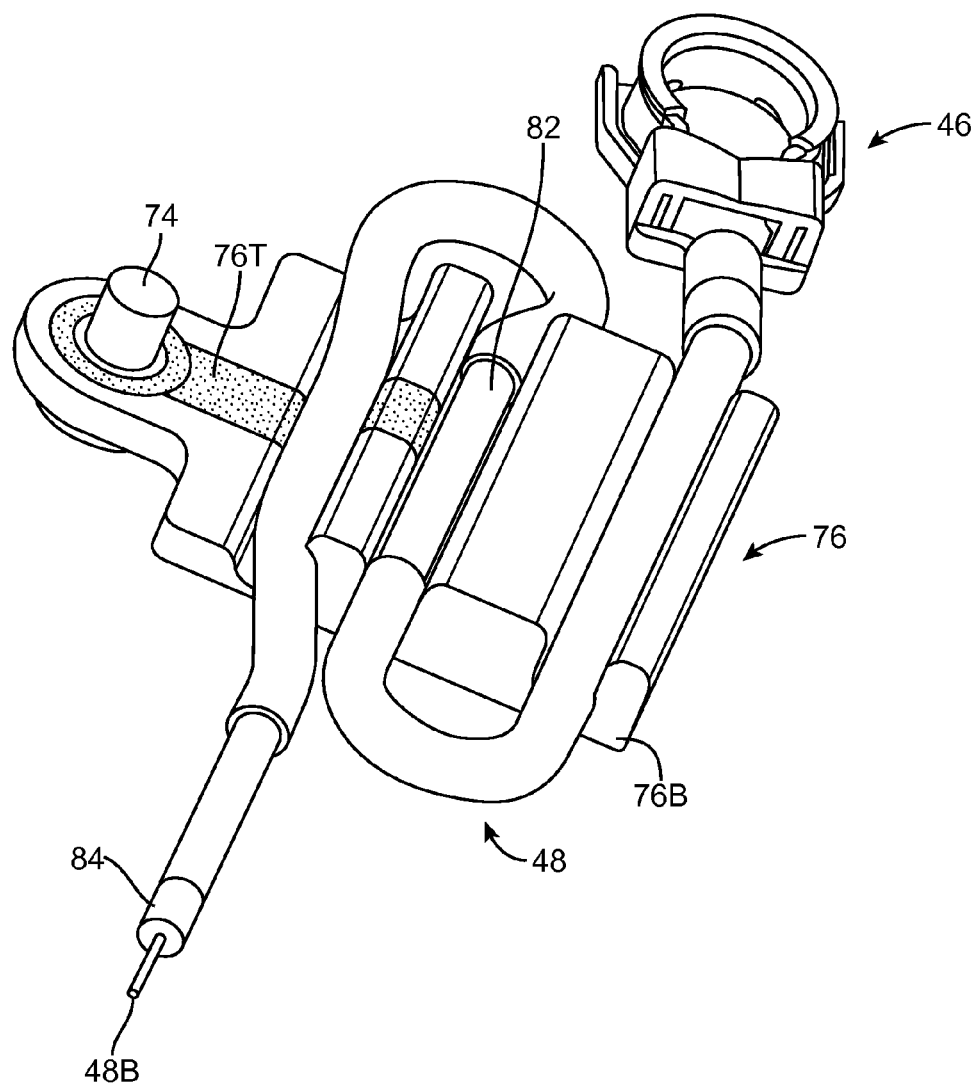
FIG. 7 is a perspective view of the illustrative cable mounting structure of FIG. 6 following the installation of a cable in accordance with an embodiment.

FIG. 7 is a perspective view of cable mounting structures 76 of FIG. 6 following installation of cable 48 within grooves 80 of cable mounting structure body 76B. In this position, outer conductor 48P, which is exposed in segment 82 of cable 48, is shorted to patterned trace 76T. Trace 76T can be coupled to ground 50 by mounting trace 76T against an exposed portion of metal housing 12 and/or using a screw such as screw 74. If desired, other fasteners, metal structures such as springs or pins, solder, welds, conductive adhesive, or other conductive materials may be used in coupling segment 82 to ground 50.

Figure 8:
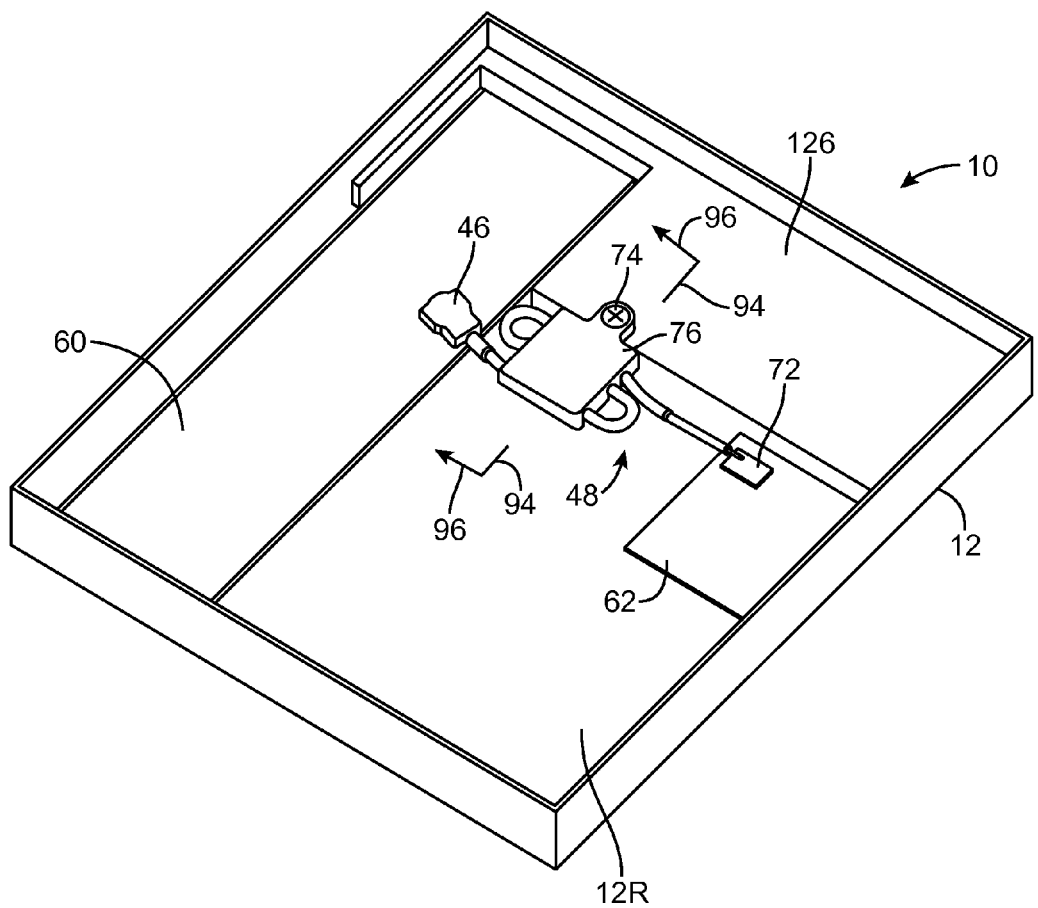
FIG. 8 is a perspective view of an interior portion of an illustrative electronic device of the type that may be provided with cable mounting structures in accordance with an embodiment.

A perspective view of device 10 in a configuration in which cable mounting structures 76 have been used to attach cable 48 to housing 12 is shown in FIG. 8.

Figure 9:
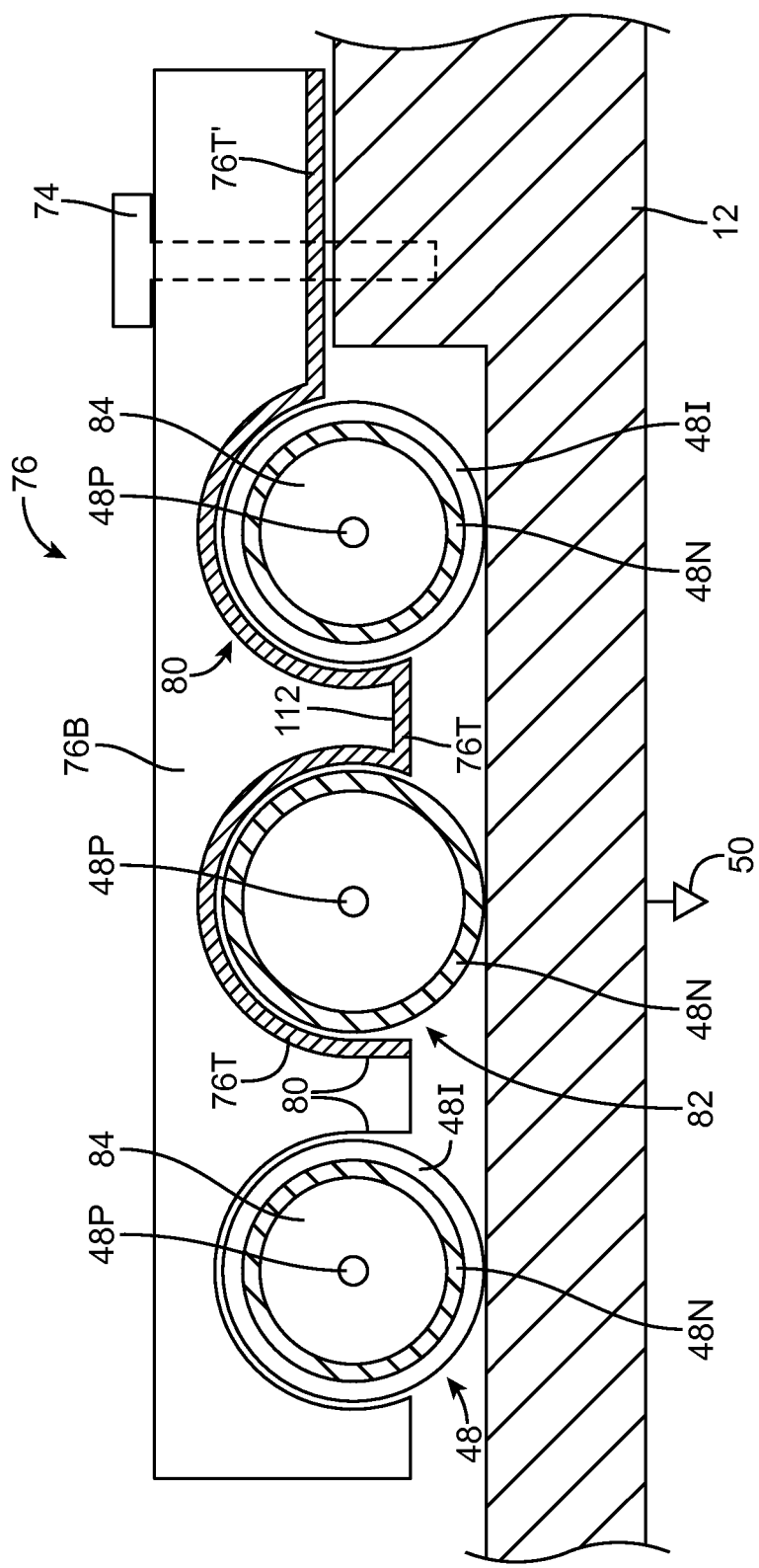
FIG. 9 is a cross-sectional side view of illustrative cable mounting structures being used to secure a meandering path segment of cable to an electronic device housing structure such as a metal electronic device housing in accordance with an embodiment.

A cross-sectional side view of cable mounting structures 76 of FIG. 8 taken along line 94 and viewed in direction 96 is shown in FIG. 9. As shown in FIG. 9, body 76B of cable mounting structures 76 has three grooves 80: a left-hand groove 80, a middle groove 80, and a right-hand groove 80. Patterned metal layer 76T runs along surface 112 of body 76B and shorts cable conductor 48N of cable segment 82 in middle groove 80 to housing 12 adjacent to screw 74. The electrical path provided by metal layer 76T helps to electrically connect conductor 48N in cable segment 82 to ground 50 (i.e., metal housing 12). Screw 74 helps compress portion 76T' of layer 76T against housing 12 to ensure proper grounding. If desired, laser processing techniques or other techniques may be used to remove oxide surface materials from metal housing 12 and/or ancillary grounding structures such as metal contacts welded or soldered to housing 12 may be used in forming a short circuit path between conductor 48N in cable segment 82 and housing 12.

In left-hand groove 80 and right-hand groove 80, outer insulating layer 48I may cover ground conductor 48N of cable 48. Insulating layer 48I is removed from cable 48 in segment 82 of cable 48 to expose conductor 48N. If desired, insulating layer 48I may be removed from other portions of cable 48 (e.g., the portions of cable 48 in the left-hand and right-hand grooves in body 76B of cable mounting structures 76). In this type of configuration, metal traces 76T may be extended to cover portions of all of grooves 80.

Figure 10:
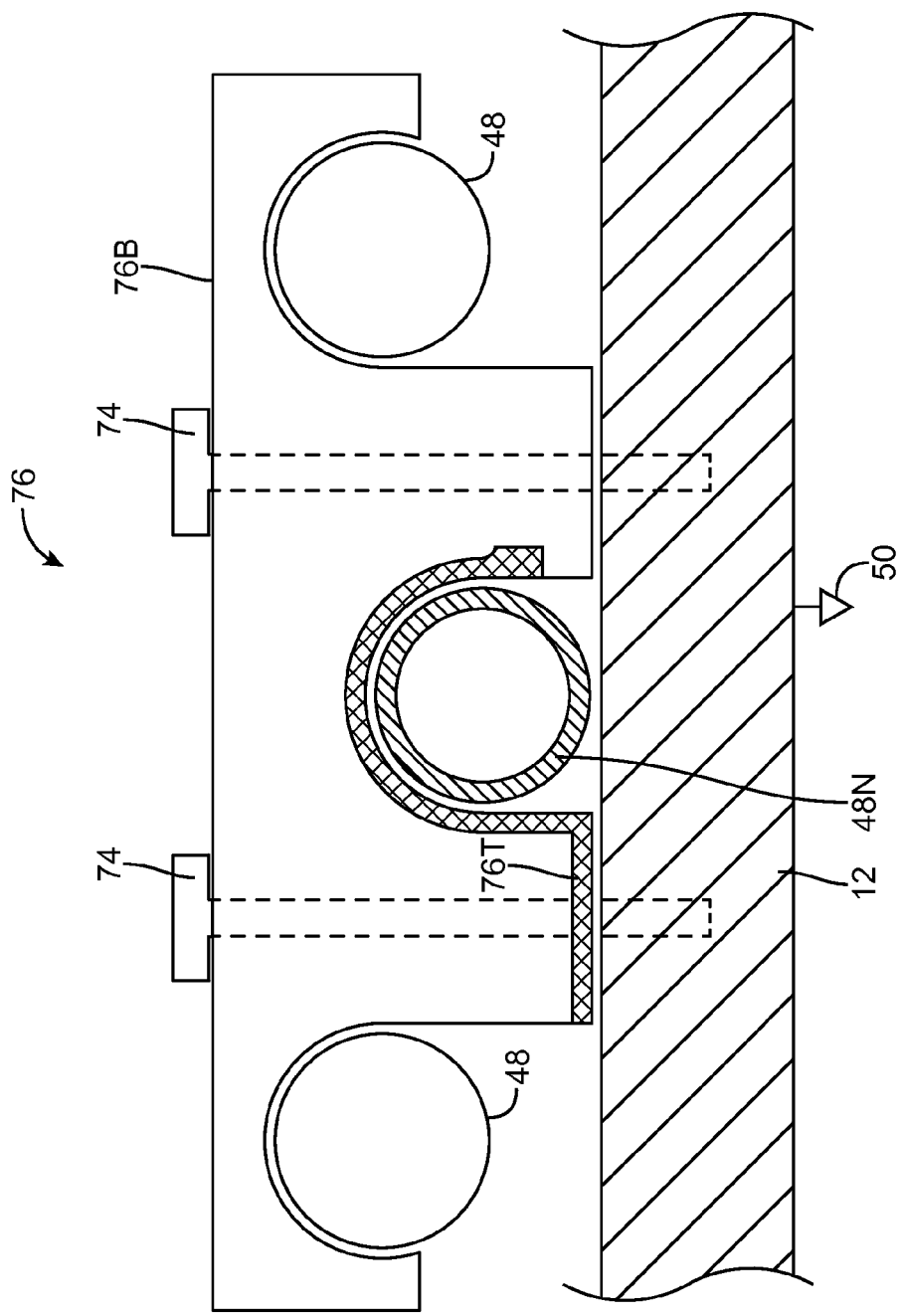
FIG. 10 is a cross-sectional side view of illustrative cable mounting structures having metal traces that short the cable to the surface of a metal electronic device housing under the cable mounting structures and cable in accordance with an embodiment.

FIG. 10 is a cross-sectional side view of cable mounting structures 76 in a configuration in which metal traces 76T have been configured to short conductor 48N in segment 82 of cable 48 to metal housing 12, thereby grounding conductor 48N to antenna ground 50. Screws 74 are screwed into threaded openings in housing 12 to press traces 76T towards housing 12 and to hold cable 48 in place. Two screws 74 are used in the illustrative configuration of FIG. 10. In general, cable mounting structures 76 may be used to mount cable 48 in device 10 using one or more screws or other fasteners, using adhesive, using snaps and other features that engage with mating features on housing 12, using welds, using solder, or using other attachment mechanisms.

Figure 11:
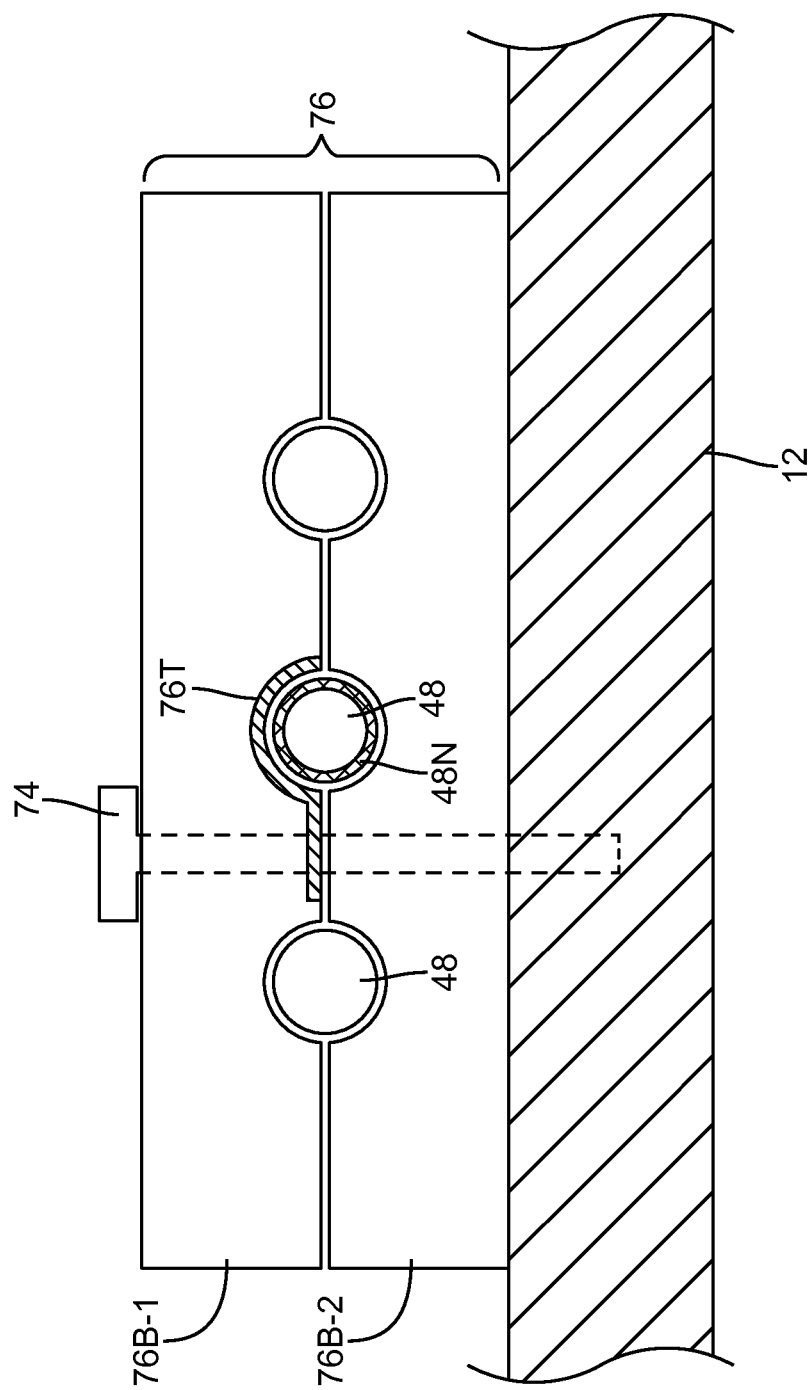
FIG. 11 is a cross-sectional side view of illustrative multi-part cable mounting structures having metal traces that short the cable to the surface of the metal electronic device housing through a fastener such as a screw in accordance with an embodiment.

FIG. 11 is a cross-sectional side view of cable mounting structures 76 in an illustrative configuration in which cable mounting structures 76 have an upper body portion 76B-1 and a lower body portion 76B-2. Cable retention features 80 (e.g., grooves or other openings) may be formed from mating recesses on portions 76B-1 and 76B-2 respectively. The mating recesses may be grooves with semicircular cross-sectional shapes.

Metal traces 76T are formed on upper body portion 76B-1 in the example of FIG. 11. If desired, metal traces 76T may be formed on lower body portion 76B-2, may be formed on both upper body portion 76B-1 and lower body portion 76B-2, may form vias or other structures that run from one surface of a dielectric cable mounting structure body member to another, or may otherwise be incorporated into cable mounting structures 76. One or more screws such as screw 74 can be used to short traces 76T (and therefore conductor 48N of cable 48 in segment 82) to metal housing 12. If desired, other conductive structures may be used in shorting traces 76T to housing 12 (e.g., adhesive, welds, snaps and other features that engage with mating features on housing 12, solder, fasteners other than screws, etc.).

Cable mounting structures 76 may be formed from machined metal (e.g., in a configuration in which body 76B and traces 76T are formed as parts of a common structure) or may be formed from multiple materials (e.g., in a configuration in which body 76B is formed from a material such as plastic and in which conductive layer 76T is formed from patterned metal).

Figure 12:
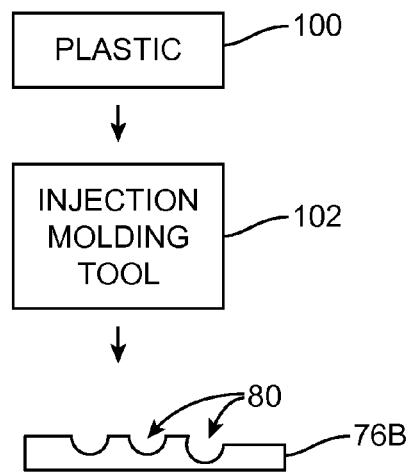
FIG. 12 is a diagram showing equipment being used to mold plastic for a cable mounting structure in accordance with an embodiment.

FIG. 12 is a system diagram showing how body 76B may be formed using plastic injection molding operations. Plastic 100 may be molded by applying heat and pressure in a mold in injection molding tool 102. The resulting plastic part (body 76B for cable mounting structures 76) may have grooves such as cable retention grooves 80. If desired, body 76B may be formed using machining operations and other manufacturing operations. The configuration of FIG. 12 in which body structure 76B has been formed as an injection molded plastic part is merely an example.

Figure 13:
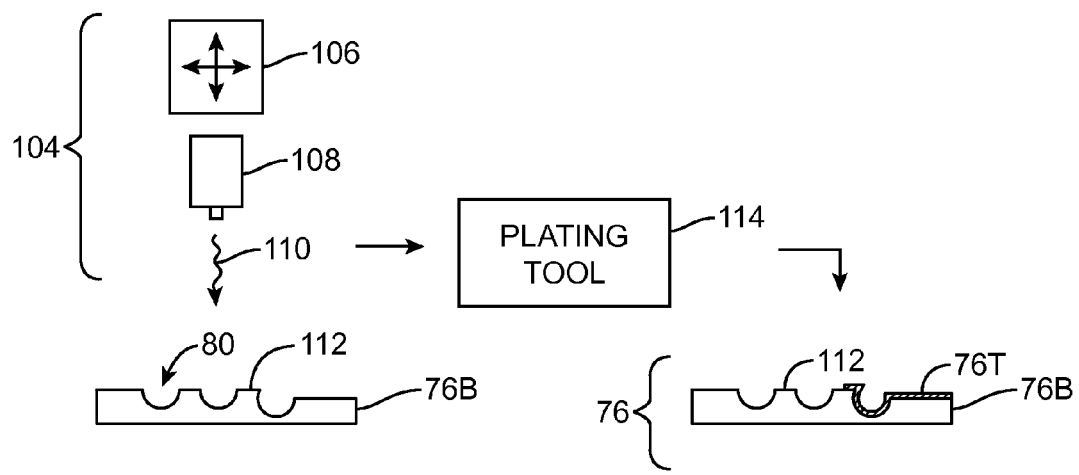
FIG. 13 is a diagram showing equipment being used to form patterned metal traces on the surface of the molded plastic structures of FIG. 12 in accordance with an embodiment.

FIG. 13 is a system diagram showing how body 76B of FIG. 12 may be coated with patterned metal traces 76T. Surface activation equipment such as laser processing equipment 104 may be used to activate a selected portion of surface 112 of plastic body 76B. Laser-processing equipment 104 includes computer-controlled positioner 106 for controlling the position of laser 108 and thereby controlling the locations on surface 112 that are exposed to laser beam 110. The exposed surface areas on body 76B promote metal growth during subsequent electrochemical deposition operations such as electroplating operations using plating tool 114. As a result, patterned metal traces 76T are grown on the exposed surface areas. If desired, other patterned metal deposition techniques may be used to form conductive traces 76T (e.g., screen printing, ink-jet printing, blanket metal deposition with physical vapor deposition equipment followed by lithographic patterning, shadow-mask deposition, painting, soldering, combinations of these approaches or other suitable approaches, etc.).

Figure 14:
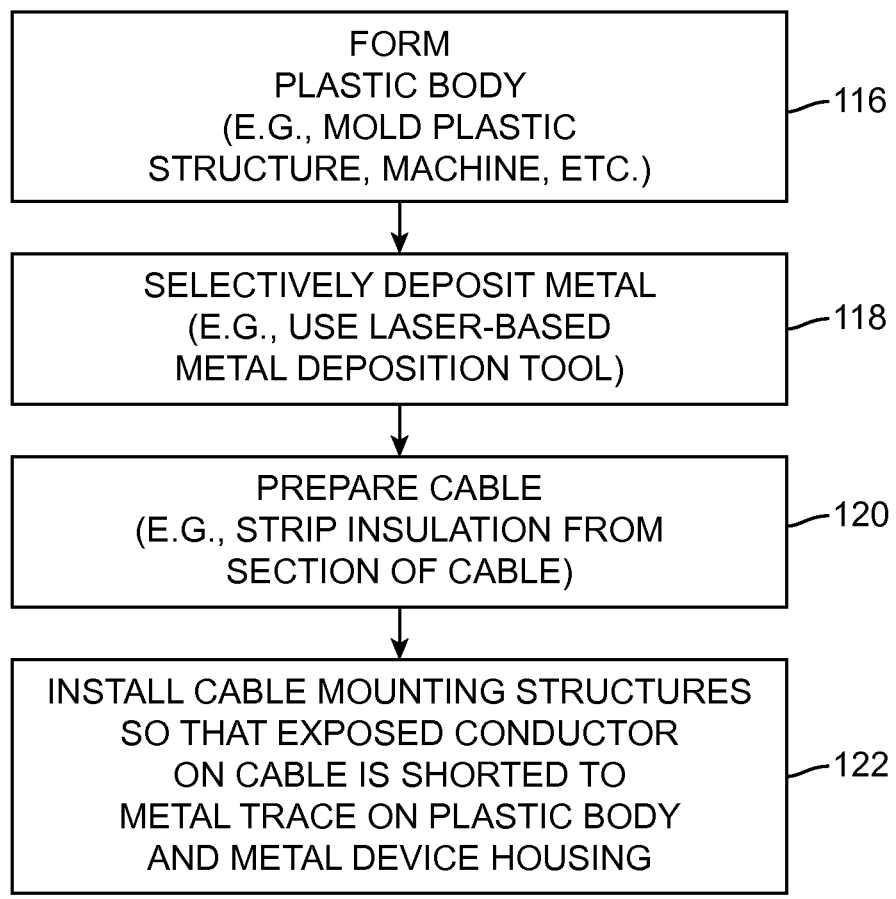
FIG. 14 is a flow chart of illustrative steps involved in forming cable mounting structures and using the cable mounting structures to secure signal path structures such as cables within an electronic device in accordance with an embodiment.

FIG. 14 is a flow chart of illustrative steps involved in using cable mounting structures 76 to install cable 48 within housing 12 of device 10. Cable 48 may be used to handle antenna signals for antenna structures 52 or other signals in device 10.

At step 116, equipment such as injection molding tool 102 is used to injection mold plastic 100 into a mold in tool 102 to form cable mounting structure body 76B. One or more recesses such as grooves 80 or other cable guiding features may be formed in body 76B to engage cable 48 during mounting in housing 12. If desired, grooves 80 or other cable engagement features may be formed during post-molding operations (e.g., using machining equipment).

Following formation of body 76B during the operations of step 116, equipment such as the equipment of FIG. 13 may be used to selectively deposit patterned metal 76T on surface 112 of body 76B at step 116. With the illustrative configuration of FIG. 13, laser processing equipment 104 is used to apply laser light 110 to portions of surface 112 on body 76B to activate those portions for subsequent metal deposition during plating operations. Plating tool 114 is then used to electrochemically deposit metal on the portion of surface 112 that have been selectively activated by application of the laser light. If desired, physical vapor deposition and lithography or other patterning techniques may be used in forming patterned metal traces on surface 112 of body 76B.

At step 120, coaxial cable 48 is prepared for installation in device 10. For example, connector 46 may be soldered onto the first end of cable 48 and conductor 48P may be exposed by stripping insulation at the second end of cable 48. Conductor 48P may then be soldered to contact pad 72. Contact pad 72 may be, for example, part of an antenna resonating element trace on substrate 62. Connector 46 may be coupled to transceiver circuitry 44 on substrate 60 before or after installation of substrates 60 and 62 into device 10.

At step 112, substrates 60 and 62 and cable 48 may be installed within housing 12 of device 10. Cable mounting structures 76 may be used to secure cable 48 to housing 12. In securing cable 48 within device 10, a service loop may be formed from meandering portions 78 of cable 48. In segment 82, transmission line conductor 48N is exposed and is contacted by trace 76T and/or metal housing 12 (or metal structures attached to metal housing 12 such as bracket structures). Metal structures such as screws 74, trace 76T, and portions of housing 12 may help short conductor 48N to ground.

Following installation of cable 48 in device 10 and completion of the assembly of device 10 by installing display 14 and other components, a user of device 10 may use cable 48 in transmitting and receiving wireless signals via antenna structures 52.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
    a cable mounting structure body having at least one cable retention groove;
    at least one conductive trace on the cable mounting structure body that overlaps the cable retention groove
    a cable having a segment in the groove, wherein the segment of the cable in the groove has an exposed outer conductor that is shorted to the conductive trace; and
    an electronic device housing, wherein the cable is pressed towards the electronic device housing by the cable mounting structure body and wherein the conductive trace comprises a metal trace that is shorted to the electronic device housing.

2. The apparatus defined in claim 1 wherein the cable mounting structure body comprises plastic.

3. The apparatus defined in claim 2 wherein the at least one cable retention groove comprises at least three grooves including a middle groove and wherein the conductive trace overlaps at least the middle groove.

4. The apparatus defined in claim 3 wherein the cable includes a meandering path portion that forms a service loop having parallel cable segments retained in the three grooves.

5. The apparatus defined in claim 4 wherein the segment of the cable that has the exposed outer conductor forms part of the service loop.

6. The apparatus defined in claim 5 wherein the cable is mounted to a portion of the electronic device housing using the cable mounting structure body.

7. The apparatus defined in claim 1 further comprising antenna structures coupled to the cable.

8. The apparatus defined in claim 7 further comprising radio-frequency transceiver circuitry, wherein the cable has opposing first and second ends, wherein the first end is coupled to radio-frequency transceiver circuitry, and wherein the second end is coupled to the antenna structures.

9. The apparatus defined in claim 8 wherein the cable has a meandering path that forms a service loop in a portion of the cable between the first and second ends and wherein the at least one groove comprises a plurality of grooves that receive the cable in the service loop.

10. The apparatus defined in claim 1 wherein the cable mounting structure body comprises opposing first and second surfaces and wherein the at least one cable retention groove comprises a plurality of cable retention grooves formed in the first surface.

11. An electronic device, comprising:
a housing having an inner surface;
radio-frequency transceiver circuitry mounted in the housing;
an antenna resonating element mounted in the housing;
a coaxial cable that is coupled between the radio-frequency transceiver circuitry and the antenna resonating element, wherein the coaxial cable has a meandering portion that forms a service loop; and
a cable mounting structure having metal traces and having cable retention features that receive the coaxial cable in the meandering portion and that attach the coaxial cable in the meandering portion to the housing, wherein the cable mounting structure has first and second opposing surfaces, wherein the first surface is parallel to the inner surface of the housing, and wherein the cable retention features are formed in the second surface.

12. The electronic device defined in claim 11 wherein the cable retention features comprise grooves that receive the cable in the meandering portion.

13. The electronic device defined in claim 11 wherein the coaxial cable includes a center conductor and an outer conductor, wherein a segment of the outer conductor is exposed in the meandering portion and wherein the metal traces short an exposed outer conductor to the housing.

14. The electronic device defined in claim 13 wherein the cable mounting structure includes a plastic body in which the grooves are formed, wherein the metal traces are formed on a surface of the plastic body, and wherein the metal traces contact the exposed outer conductor in at least one of the grooves.

15. The electronic device defined in claim 14 wherein the cable mounting structure includes at least one screw hole and wherein the electronic device further comprises a screw that passes through the screw hole to mount the cable mounting structure to the housing.

16. The electronic device defined in claim 13 wherein the coaxial cable includes an outer layer of insulator and wherein the segment of the outer conductor is exposed where a portion of the outer layer of insulator has been removed.

17. A method of forming cable retention structures, comprising:
forming a cable retention structure body having opposing first and second surfaces and having cable retention features formed in the first surface configured to receive a coaxial cable; and
forming a patterned metal layer on the cable retention structure body that includes portions overlapping the cable retention features.

18. The method defined in claim 17 wherein the cable retention features comprise grooves in the first surface configured to receive the coaxial cable and wherein forming the cable retention structure body comprises injection molding plastic to form a molded plastic body for the cable retention structures.

19. The method defined in claim 18 wherein forming the patterned metal layer comprises activating a selected surface area on the molded plastic body with laser light.

20. The method defined in claim 19 wherein forming the patterned metal layer comprises selectively plating metal in the selected surface area to form a metal trace.

* * * * *